United States Patent [19]
Jin

[11] Patent Number: 5,460,335
[45] Date of Patent: Oct. 24, 1995

[54] REEL BRAKING DEVICE FOR USE IN A DECK MECHANISM

[75] Inventor: Hong J. Jin, Seoul, Rep. of Korea

[73] Assignee: Goldstar Co., Ltd., Seoul, Rep. of Korea

[21] Appl. No.: 232,427

[22] Filed: Apr. 21, 1994

Related U.S. Application Data

[63] Continuation of Ser. No. 889,967, May 29, 1992, abandoned.

[30] Foreign Application Priority Data

May 31, 1991 [KR] Rep. of Korea ..................... 9040/1991

[51] Int. Cl.⁶ .................................................. B65H 16/10
[52] U.S. Cl. ............................................................ 242/355
[58] Field of Search ................................ 242/198, 199, 242/200, 201, 202, 203, 204, 205, 355, 356.6, 356.7

[56] References Cited

U.S. PATENT DOCUMENTS 3,995,319  11/1976  Harris .
4,416,432  11/1983  Komatsubara et al. ................. 242/199
4,466,584   8/1984  Chevalier et al. .
4,482,104  11/1984  Saito .
4,553,717  11/1985  Takagi .
4,604,671   8/1986  Oishi .
4,635,878   1/1987  Didriksen ............................... 242/204
4,702,434  10/1987  Bauer .
4,807,061   2/1989  Yoon ...................................... 242/204

FOREIGN PATENT DOCUMENTS 9018598   6/1992  Rep. of Korea .

Primary Examiner—Daniel P. Stodola
Assistant Examiner—Eileen A. Dunn
Attorney, Agent, or Firm—Birch, Stewart, Kolasch & Birch

[57] ABSTRACT

A reel braking device for small-sized tape recorders capable of ensuring the braking operation and simplifying the structure, comprising a reel gear, disposed below a take-up reel, having a cylindrical guide surface and a geared portion in a stair type, and a rotating member having an elastic member for contacting resiliently with the guide surface of the reel gear and for changing the rotational direction of the rotating member in response to the rotation of the reel gear and a ratchet for restricting the rotation of the reel gear.

5 Claims, 3 Drawing Sheets

REEL BRAKING DEVICE FOR USE IN A DECK MECHANISM

This application is a continuation of application Ser. No. 07/889,967, filed on May 29, 1992, now abandoned.

BACKGROUND OF THE INVENTION

1. Field of the Invention

The present invention relates to a reel braking device for use in a deck mechanism for small-sized tape recorders and more particularly, to a reel braking device for use in a deck mechanism for small-sized tape recorders which is capable of preventing a reel gear of a take-up reel table from being rotated in an inverse direction or allowing the reel gear to be rotated in a normal direction by rotating in a clockwise or counterclockwise direction in accordance with the rotational direction of the reel gear.

2. Description of the Prior Art

Generally, in the deck mechanism of small-sized tape recorders, a reel gear is provided below a take-up reel which rotates the take-up reel by receiving power from an idler gear, and a reel braking device is disposed adjacent to the reel gear which restricts the inverse rotation of the reel gear. A typical reel braking device is disclosed in Korean Patent Application No. 90-18598, filed on Nov. 16, 1990 in the name of the same applicant as the present invention. The reel braking device disclosed in this reference is constituted such that a shaft is fixed on a base plate adjacent to a reel gear, a braking gear is rotatably mounted to the shaft through the intermediary of a coil spring which is meshed with the reel gear, an arm having at its one end a claw which is coaxially mounted to the shaft through the intermediary of a frictional member such as a felt so that the braking gear meshing with the reel gear rotates the arm by rotating in a clockwise or counterclockwise direction in accordance with the rotational direction of the reel gear. When the reel gear is rotated in a counterclockwise direction, that is, when a tape is released from the take-up reel, the claw of the arm is meshed with the reel gear, thereby restricting the rotation of the reel gear in a counterclockwise direction. Under such a condition that the counterclockwise rotation of the reel gear is restricted, the take-up reel is rotated by the releasing force of tape with the frictional force of the felt so that the tape is prevented from being freely released, while receiving a predetermined tensional force.

However, such a conventional reel braking device has disadvantages in that since the coil spring is in direct contact with the lower surface of the braking gear, the entanglement of the coil spring may occur when the braking gear is continuously rotated in a clockwise or counterclockwise direction in accordance with the rotational direction of the reel gear, whereby the rotational operation of the braking gear is not smoothly carried out.

Moreover, since such a conventional reel braking device requires a relatively large number of parts, the assembling work becomes cumbersome and the manufacturing cost rises.

SUMMARY OF THE INVENTION

Accordingly, it is an object of the present invention to provide a reel braking device which is capable of smoothly executing the reel braking operation with a simple construction.

Another object of the present invention is to provide a reel braking device, which comprises a cylindrical guide surface formed at an upper portion of a reel gear of a take-up reel and a rotating member having an arcuate elastic member for contacting elastically with the guide surface of the reel gear and a ratchet for engaging with or separating from the reel gear in accordance with the rotation of the reel gear.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a reel braking device for a deck mechanism of a small-sized tape recorder which comprises a take-up reel including a reel gear having at its outer peripheral surface a guide surface and a stepped geared portion and a rotating member, disposed adjacent to the take-up reel, including an elastic member for contacting elastically with the guide surface of the reel gear and a ratchet for meshing with the geared portion of the reel gear so as to restrict the rotation of the reel gear.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
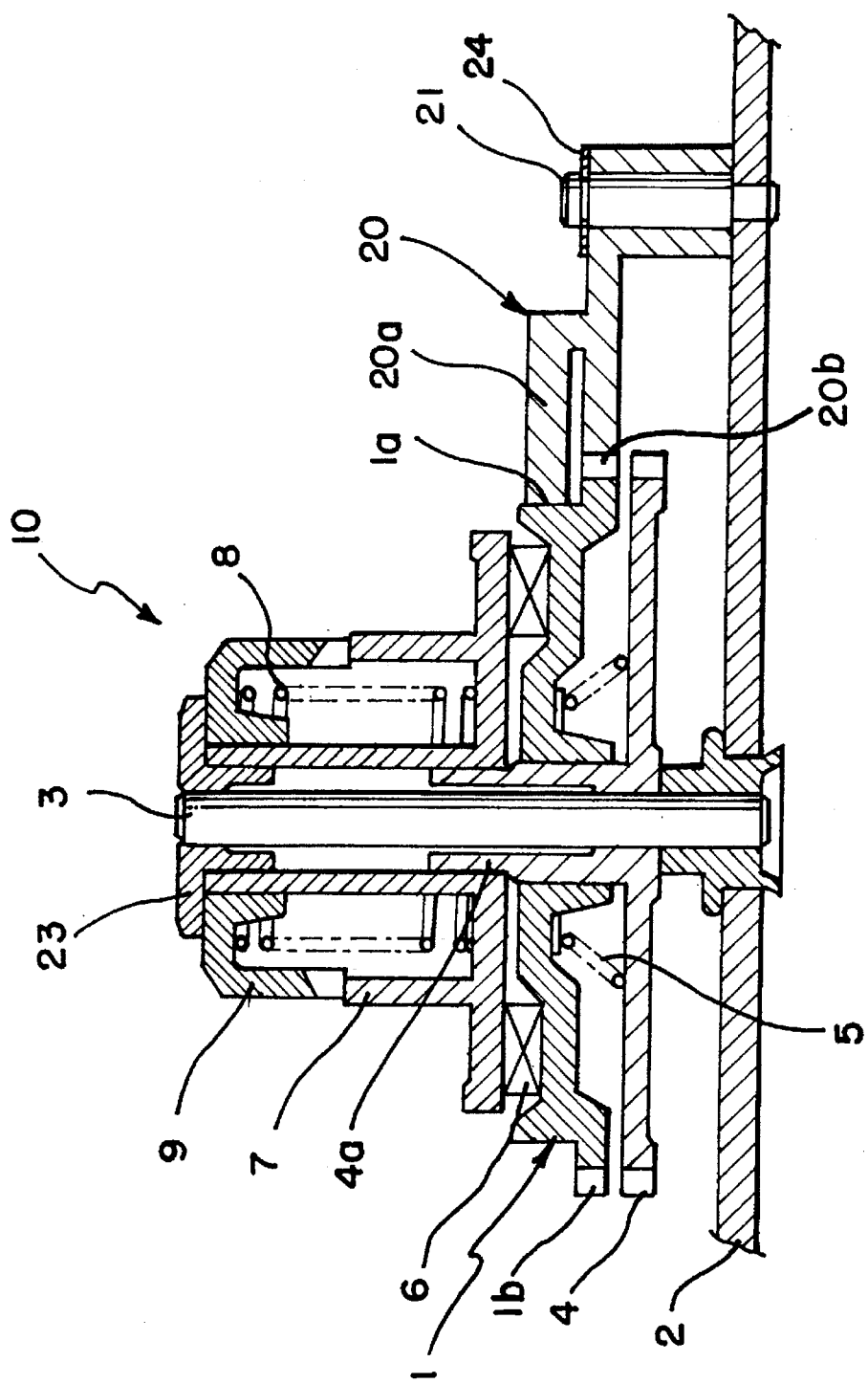
FIG. 1 is a sectional view of the reel braking device of the present invention.
Figure 2:
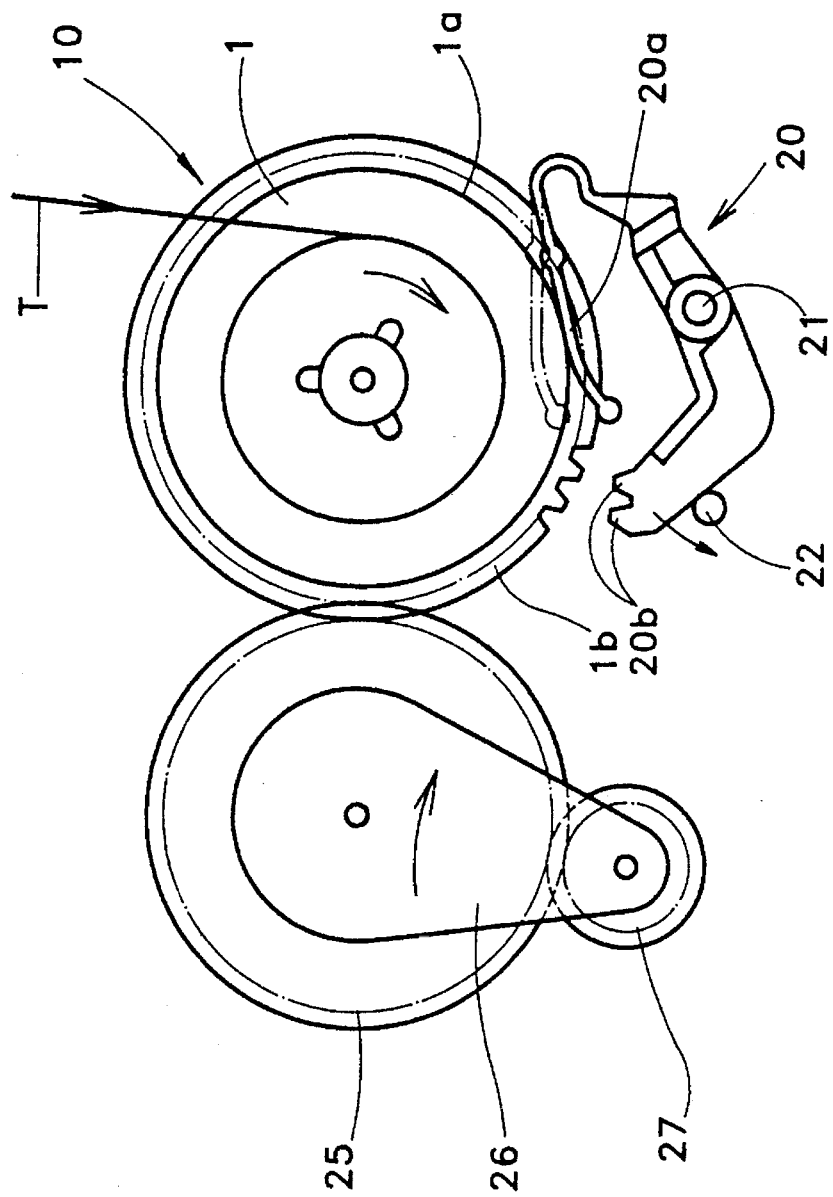
FIG. 2 is a plane view of the reel braking device of the present invention in the normal direction rotation mode.
Figure 3:
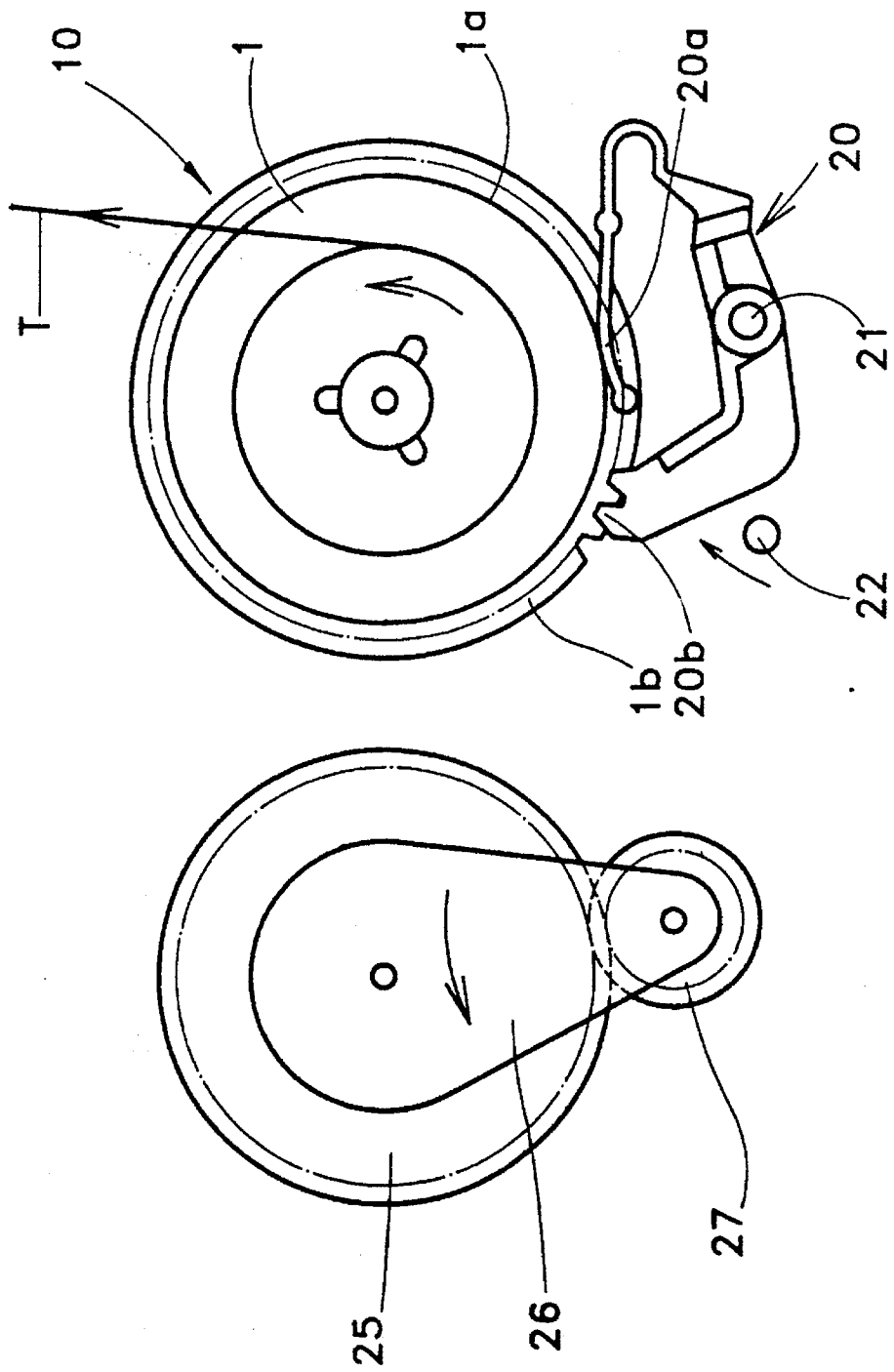
FIG. 3 is a plane view of the reel braking device of the present invention in the inverse direction rotation mode.

Referring now in detail to the drawings for the purpose of illustrating preferred embodiments of the present invention, the reel braking device for a deck mechanism of small-sized tape recorders as shown in FIGS. 1 to 3, comprises a take-up reel 10 including a reel gear 1 provided with a guide surface 1a and a geared portion 1b with the guide surface 1a and geared portion 1b forming a step, and a rotating member 20 rotatably mounted adjacent to the take-up reel 10 for applying a braking operation to the reel gear 1 or releasing the braking force from the reel gear 1 depending upon the advancing direction of the tape T.

The take-up reel 10 includes a reel drive gear 4 having a hub 4a which is rotatably mounted to a shaft 3 fixed on a main base 2, the above-mentioned reel gear 1 being rotatably mounted on the hub 4a of the reel drive gear 4 and supported by a coil spring 5 disposed between the upper surface of the reel drive gear 4 and the lower surface of the reel gear 1, a lower reel disk 7 rotatably disposed over the reel gear 1 through the intermediary of a felt 6, and an upper reel disk 9 coupled with the lower reel disk 7 through the intermediary of a coil spring 8 so as to be rotated together with the lower reel disk 7.

The rotating member 20 is rotatably mounted to an axial pin 21 disposed adjacent to the shaft 3 on the main base 2.

The rotating member 20 is provided at its one end with an elastic member 20a for elastically contacting with the guide surface 1a of the reel gear 1 and at its other end with a ratchet 20b for engaging with the geared portion 1b of the reel gear 1. Also, the rotating member 20 has a counterclockwise rotational force by the resilient force of the elastic member 20a, as shown in FIG. 2, and its counterclockwise rotational force is restricted by a stopper 22 fixed adjacent to the ratchet 20b of the rotating member 20 on the main base 2.

The elastic member 20a of the rotating member 20 has an arcuate configuration so as to resiliently contact the guide surface 1a of the reel gear 1 so that in a case where the reel gear 1 is in a stop state or rotates clockwise, based on FIGS. 2 and 3, the rotating member 20 is maintained in a state that its one end at the ratchet 20b side is held by the stopper 22 by means of the counterclockwise rotational force of the elastic member 20a, while in a case where the reel gear rotates counterclockwise, the rotating member 20 is rotated clockwise by the frictional force between the elastic member 20a of the rotating member 20 and the guide surface 1a of the reel gear 1, thereby causing the ratchet 20b to be engaged with the geared portion 1b of the reel gear 1.

The stopper 22 is adapted to restrict the range of the rotation in a direction counterclockwise of the rotating member 20 so that the rotating member 20 may quickly apply a braking force to the reel gear 1 when the reel gear 1 is Inversely rotated.

In the drawings, reference numeral 23 is a cap for supporting the elements of the reel table 10 to the shaft 3, 24 is a washer for mounting the rotating member 20 to the axial pin 21, 25 is an idler gear, 26 is an Idler arm, and 27 is a central gear.

The reel braking device of the present invention operates as follows:

In assembling the rotating member 20, the rotating member 20 is first assembled to the axial pin 21 and then the resilent member 20a is pulled toward the axial pin 21, as shown in real line in FIG. 2, and pushed downwardly. Thus, the elastic member 20a contacts resiliently with the cylindrical guide surface 1a of the reel gear 1.

Under these states, the end at the ratchet side of the rotating member 20 is held by the stopper 22 by the counterclockwise rotational force originated from the resilient force of the elastic member 20a.

In the normal mode that the tape T is wound around the take-up reel 10, the drive force from the central gear 27 is transferred to the reel drive gear 4 through the idler gear 25 so that the reel gear 1 and the lower reel disk 7 are rotated clockwise and thus the take-up reel 10 is rotated clockwise. As a result, the tape T is wound around the take-up reel 10. At this moment, since the rotating member 20 is held by the stopper 22 by virtue of the counterclockwise rotational force of the elastic member 20a, the ratchet 20b of the rotating member 20 does not contact with the geared portion 1b of the reel gear 1.

On the other hand, in the inverse rotation mode, as shown in FIG. 3, since the idler gear 25 is separated from the reel drive gear 4 and the tape T is released from the take-up reel 10, the upper and lower reel disks 9 and 7 and the reel gear 1 are rotated counterclockwise by virtue of the releasing force of the tape T. At this moment, the elastic member 20a of the rotating member 20 contacting with the guide surface 1a of the reel gear 1 receives a frictional force in response to the clockwise rotation of the reel gear 1, the rotating member 20 rotates clockwise based on the axial pin 21 so that the ratchet 20b of the rotating member 20 engages with the geared portion 1b of the reel gear 1, thereby preventing the reel gear 1 from being rotated any further. At this moment, the lower reel disk 7 rotates, together with the upper reel disk 9, counterclockwise upon receiving a predetermined torque by virtue of the frictional force of the felt 6.

As described above in detail, the present invention provides the effect that the structure of the reel braking device for use in small-sized deck mechanisms is simplified by use of a single element having an inherent elasticity and also the assembling performance can be enhanced by virtue of the simplicity of the structure and by excluding the coil spring required in the prior art device.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A reel braking device comprising:

a reel gear member rotatably mounted on a shaft, said reel gear member including a geared portion at an outer periphery of said reel gear member, and a guide surface parallel to and stepped with respect to said geared portion; and a rotating member positioned adjacent to said reel gear member, said rotating member including a first arm portion of a bent configuration having first and second segments, the second segment having a ratchet formed at a distal end thereof, a resilient second arm portion in surface contact with said guide surface of said reel gear member and integrally connected to said first arm portion at an end opposite to the distal end of the second segment such that said resilient second arm portion contacts the guide surface and said ratchet of said second segment selectively contacts said geared portion, and an axial pin formed in the first segment of said first arm portion which is parallel to said resilient second arm portion and about which said first and second arm portions bidirectionally rotate, wherein rotation of said reel gear member in a winding direction biases said resilient second arm portion away from said guide surface thereby rotating said rotating member in an unwinding direction about said axial pin to disengage said ratchet from said geared portion, and rotation of said reel gear member in an unwinding direction biases said resilient second arm toward said guide surface thereby rotating said rotating member in a winding direction about said axial pin to engage said ratchet with said geared portion thereby braking rotation of said reel gear member.

2. The reel braking device according to claim 1, wherein said resilient second arm portion includes an arcuate elastic member which is bent to be substantially parallel to the first segment of said first arm portion and perpendicular to the second segment of said first arm portion.

3. The reel braking device according to claim 1, wherein said resilient second arm portion releases a braking force against the guide surface of said reel gear member in a winding direction of said reel gear member, and applies the braking force to the geared portion of said reel gear member in an unwinding direction of said reel gear member.

4. The reel braking device according to claim 1, further including a stopper member positioned to limit an outward movement of said first arm portion to a predetermined distance from said geared portion.

5. The reel braking device according to claim 1, wherein said geared portion is of a greater diameter than said guide surface.

* * * * *